United States Patent Office 3,846,165
Patented Nov. 5, 1974

3,846,165
METHOD OF APPLYING AN ANTI-REFLECTIVE COATING ON A SEMICONDUCTOR LASER
Michael Ettenberg, Freehold, N.J., and Stephen Lee Gilbert, Newtown, Pa., assignors to RCA Corporation
Filed Aug. 21, 1972, Ser. No. 282,273
Int. Cl. H01l 7/00
U.S. Cl. 117—201                             8 Claims

ABSTRACT OF THE DISCLOSURE

A semiconductor laser is provided on a surface thereof with an anti-reflective coating of a desired reflectivity by coating the surface with an anti-reflective material in a manner so as to progressively increase the thickness of the coated layer of the material. During the coating operation the laser is energized to emit radiation therefrom, and the power of the emitted radiation, which is a function of the reflectivity of the anti-reflective coating, is measured. When emitted radiation of a power corresponding to the desired reflectivity of the anti-reflective coating is reached, the coating operation is discontinued.

BACKGROUND OF THE INVENTION

The present invention relates to a method of applying an anti-reflective coating onto a surface of a semiconductor laser in order to obtain a desired reflectivity of the anti-reflective coating.

Semiconductor lasers comprise a body of a semi-conductor material which is adapted to generate radiant energy when properly activated, with the radiant energy being emitted from a surface thereof as coherent radiation. In order to achieve the emission of coherent radiation, opposite end surfaces of the body must be at least partially reflective so as to form a Fabry-Perot cavity within the body. To achieve emission of the coherent radiation from only one of the end surfaces, that surface must be less reflective than the other end surface. To achieve this difference in reflectivity of the end surfaces, is the general practice to provide the surface which is to be of lower reflectivity with an anti-reflective coating.

When an anti-reflective coating is applied to a surface of a semiconductor laser consideration must be given not only to the reduction of the reflectivity of the end surface but also to maintaining sufficient reflectivity to form a Fabry-Perot cavity. The reflectivity of a surface coated with an anti-reflective coating is a function of the index of refraction of the material of the semiconductor body, the index of refraction of the material of the anti-reflective coating, the thickness of the anti-reflective coating and the exact wavelength of the radiation emitted by the semiconducor laser. In the manufacturing of semiconductor lasers it is desirable to be able to control the application of the anti-reflective coating so as to achieve an end surface of the desired reflectivity. Because of the many factors which determine the reflectivity of the coated surface, merely measuring the thickness of the anti-reflective coating is not the most satisfaotcry method of controlling the application of the anti-reflective coating to achieve a desired reflectivity.

SUMMARY OF THE INVENTION

An anti-reflective coating is applied to an end surface of a semiconductor laser by coating the surface of the laser with an anti-reflective material in a manner so as to progressively increase the thickness of the layer of the material. During the coating the radiant energy output of the laser is measured. When a desired output is achieved the coating is stopped.

DETAILED DESCRIPTION

Figure 1:
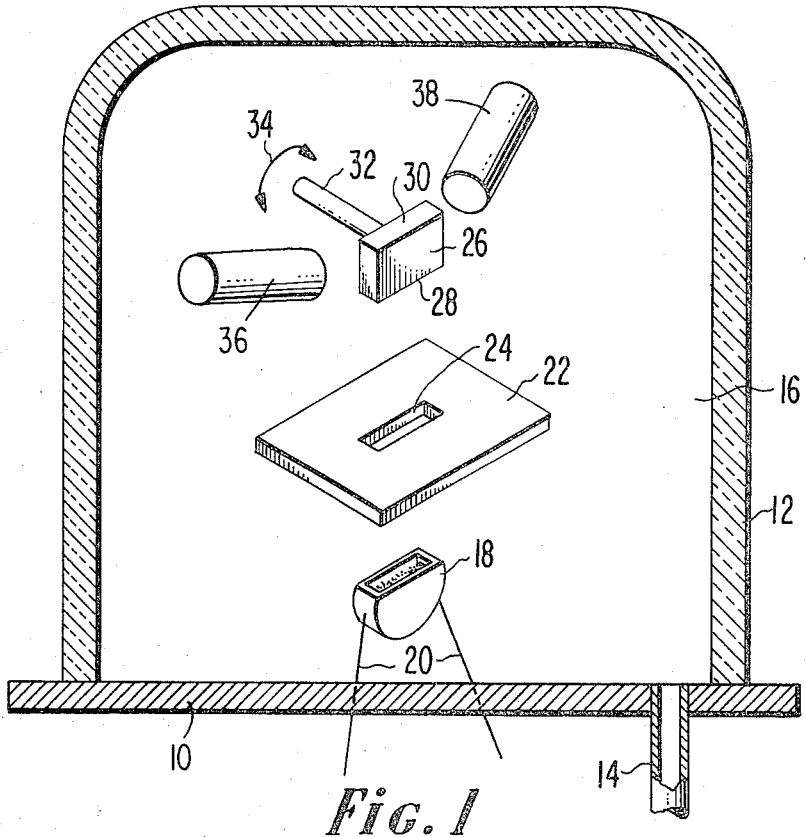
FIG. 1 is a schematic view of an apparatus suitable for carrying out one form of the method of the present invention.

Referring initially to FIG. 1 there is shown an apparatus for carrying out one form of the method of the present invention. In this apparatus the anti-reflective coating is applied to the semi-conductor laser by the well known technique of evaporation in a vacuum. The apparatus comprises a base plate 10 and a cover 12, such as a bell jar, removably seated on the base plate with a hermetic seal being provided in conventional manner, not shown, between the cover and the base plate. A pipe 14 extends through the base plate 10 and is connected to means, such as a pump (not shown), to evacuate the chamber 16 between the cover 12 and the base plate 10. An evaporator 18 is mounted in the chamber 16 and is adapted to contain the anti-reflective material to be coated on the semiconductor laser. The evaporator 18 may be a boat shaped body of a material which will withstand high temperatures and will heat up when an electrical current is passed therethrough, such as carbon or tungsten. Wires 20 are connected to opposite ends of the evaporator 18 and extend through the base plate 10. The wires 20 are connected across a source of electrical current, not shown. A mask plate 22 extends over the evaporator 18 and has an opening 24 therethrough directly over the evaporator.

A semiconductor laser 26 is supported directly over the opening 24 in the mask plate 22. The semiconductor laser 26 shown is a flat, rectangular body of a semiconductor material having a PN junction therein which extends parallel to the flat surfaces of the body to the edges of the body. The end surfaces 28 and 30 of the laser body 26 are polished so that they are partially reflective and partially transparent. This forms a Fabry-Perot cavity within the laser body. The flat surfaces of the laser body 26 are each coated with a metal layer which serves as a contact for the laser. The contacts are connected by wires, not shown, to a source of electrical voltage. This permits a voltage to be applied across the PN junction of the laser 26 so as to energize the laser to generate radiation which is emitted from the end surfaces 28 and 30 of the laser.

The laser 26 is mounted on the end of a rod 32 which extends perpendicularly with respect to a flat surface of the laser. The rod is mounted for reciprocating rotation about its longitudinal axis and is connected to suitable means, such as a rotary solenoid (not shown), for reciprocating the rod through about 90° as indicated by the double-headed arrow 34. A pair of radiation detectors 36 and 38 are mounted at opposite sides of the laser 26 with their radiation receiving ends facing the sides of the laser. The radiation detectors 36 and 38 are shown as being angled with respect to each other so that they will not receive any reflection from the other detector. The detectors may be of any well known type suitable for detecting the radiation emitted by the laser 26 and providing an electrical output corresponding to the power of the radiation emitted by the laser, such as a silicon PN photodiode or a silicon avalanche photodiode. The detectors 36 and 38 are connected to suitable instrumentation (not shown) for indicating the outputs of the detectors. For reasons which will be explained, it is preferable that the detectors 36 and 38 be connected to an instrumentation which indicates the ratio of the outputs of the detectors so as to provide an indication of the ratio of the powers of the radiations sensed by the detectors.

To carry out the method of the present invention, the rod 32 is rotated to position the laser 26 with its end surface 28 facing the opening 24 in the mask plate 22, and the material of the anti-reflective coating, such as silicon monoxide, aluminum oxide or tungsten oxide, is placed in the evaporator 18. The chamber 16 is evacuated to a suitable pressure, generally about $10^{-6}$ torr, and an electrical current is passed through the evaporator 18 to heat the evaporator and its contents. The anti-reflective material in the evaporator 18 is heated to a temperature at which the material evaporates at the pressure in the chamber 16. Some of the vapors of the anti-reflective material pass through the opening 24 in the mask and contact the end surface 28 of the laser 26. The vapors of the anti-reflective material which contact the end surface 28 of the laser 26 condense thereon to form an anti-reflective coating. This coating of the laser end surface 28 is continued for a short period of time to allow a thin layer of the anti-reflective material to be deposited on the end surface and then is interrupted by either lowering the temperature of the evaporator 18 and/or placing a shutter (not shown) across the mask plate opening 24 to stop the flow of vapors to the laser.

The rod 32 is then rotated to position the laser end surface 28 and 30 in alignment with the radiation detectors 36 and 38 respectively. A voltage is applied across the laser 26 so that the laser generates radiation which is emitted from the end surfaces 28 and 30. The radiation emitted from the laser end surfaces 28 and 30 is detected by the detectors 36 and 38 which provide an output signal corresponding to the power, peak or average, of the emitted radiation. It is known that the ratio of the power of the emitted radiation from the ends of a laser is a function of the reflectivities of the ends of the laser according to the following formula:

$$\frac{P_1}{P_2} = \left(\frac{R_2}{R_1}\right)^{1/2} \left(\frac{1-R_1}{1-R_2}\right)$$

where $P_1$ = power of radiation from coated end surface 28
$P_2$ = power of radiation from uncoated end surface 30
$R_1$ = reflectivity of coated end surface 28
$R_2$ = reflectivity of uncoated end surface 30 which is based on index of refraction of semiconductor material of the laser 26.

Since the reflectivity of the uncoated end of the laser, i.e. $R_2$, is fixed and is known, it being based on the index of refraction of the semiconductor material of the laser, the ratio of the power of the radiation emitted from the two ends provides an indication of the reflectivity of the coated end surface. As the thickness of the anti-reflective coating on the laser surface 28 increases, the reflectivity of the coated end surface, i.e. $R_1$, decreases. As the reflectivity of the coated end surface, $R_1$, decreases, the power of the radiation emitted from the uncoated end surface 30, i.e. $P_2$, decreases rapidly. Thus, the ratio of the power of the emitted radiation from the end surfaces increases rapidly. Thus, a desired reflectivity for the coated end can be accurately determined by monitoring the ratio of the power of the emitted radiation.

If the ratio of the power of the radiation emitted from the end surfaces 28 and 30 of the laser 26 is too low, the rod 32 is rotated to position the laser end surface 28 back in alignment with the mask opening 24. The flow of the vapor of the anti-reflective material to the laser end surface 28 is then restarted either by increasing the temperature of the evaporator 18 and/or by removing the shutter from across the mask opening 24. This coating of the laser end surface 28 is continued for a short period of time to allow the layer of the anti-reflective coating to become thicker and thus further reduces the reflectivity of the laser end surface 28. The coating is then again interrupted and the power of the radiation emitted from the end surfaces 28 and 30 is again measured by the radiation detectors 36 and 38 in the manner as previously described. If the ratio of the power of the radiation emitted from the end surfaces 28 and 30 is still too low, indicating that the reflectivity of the coated end surface 28 is still too high, the coating operation is again restarted. Thus, the anti-reflective material is applied to the laser end surface 28 in a manner so as to progressively increase the thickness of the layer of the anti-reflective coating on the laser end surface. The coating operation is intermittently interrupted and the ratio of the power of the radiation emitted from the laser end surfaces 28 and 30 is measured by applying a voltage across the laser 26 and detecting the radiation emitted from the end surfaces. When a desired reflectivity of the coated end surface 28 is reached, as indicated by the ratio of the power of the radiation emitted from the end surfaces 28 and 30, the coating operation is discontinued. The laser 26 can then be removed from the chamber 16.

Figure 2:
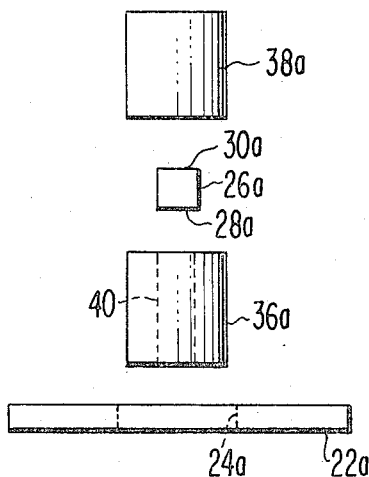
FIG. 2 is a schematic view of an apparatus suitable for carrying out another form of the method of the present invention.
Figure 2:

Referring to FIG. 2, there is shown another form of an apparatus for carrying out another form of the method of the present invention. The apparatus shown in FIG. 2 is incorporated in a chamber which can be evacuated, such as the chamber 16 formed between the base plate 10 and cover 12 shown in FIG. 1. The apparatus includes an evaporator 18a having wires 20a connected to opposite ends thereof to permit an electrical current to be passed through the evaporator. A mask plate 22a having an opening 24a is mounted over the evaporator 18a. A semiconductor laser 26a having radiation emitting end surfaces 28a and 30a is mounted above the evaporator 18a with the end surface 28a facing the evaporator and in alignment with the mask plate opening 24a. A radiation detector 38a is mounted above the semiconductor laser 26a and faces the end surface 30a of the laser so as to detect the radiation emitted from the end surface 30a. A radiation detector 36a is mounted between the laser 26a and the mask plate 22a and has a hole 40 therethrough which is in alignment with the mask plate opening 24a. The detector 36a is positioned to detect radiation from the end surface 28a of the laser 26a.

In the use of this form of the apparatus, the chamber containing the apparatus is evacuated and a current is passed through the evaporation 18a to heat the evaporator. The evaporator 18a is heated to a temperature at which the anti-reflective material in the evaporator vaporizes. The vapors of the anti-reflective material flow upwardly through mask plate opening 24a and the hole 40 through the detector 36a to contact the end surface 28a of the semiconductor laser 26a. The vapors condense on the laser end surface 28a to form a layer of an anti-reflective coating which progressively increases in thickness. During the coating operation, a voltage is applied across the laser 26a so as to cause radiation to be emitted from the end surfaces 28a and 30a. The radiation from the end surfaces 28a and 30a are detected by the detectors 36a and 38a respectively which provide an output signal corresponding to the power of the emitted radiation. As previously described, the ratio of the power of the radiation emitted from the end surfaces 28a and 30a of the laser 26a provides an indication of the reflectivity of the coated end surface 28a. When a desired ratio is detected, indicating that the desired reflectivity has been reached, the coating operation is stopped. Thus, this form of the method of the present invention is the same as the form of method previously described except that the radiation emitted from the ends of the laser is continuously monitored without any interruption of the coating operation.

Still another form of the method of the present invention using the apparatus shown in FIG. 2 is to coat the end surface 28a of the semiconductor laser 26a with an anti-reflective coating which is of a thickness equal to one-quarter of the wavelength of the emitted radiation.

in the material of the anti-reflective coating. In this form of the method of the present invention, like in the form previously described, the evaporator 18a is heated to a temperature at which the anti-reflective material in the evaporator vaporizes. The vapors of the anti-reflective material flow upwardly to contact the end surface 28a of the semiconductor laser 26a and condense thereon to form a layer of an anti-reflective coating which progressively increases in thickness. A voltage is applied across the laser 26a so as to cause radiation to be emitted from the end surfaces 28a and 30a. However, in this form of the method only the radiation emitted from the uncoated end surface 30a of the laser 26a is detected by the detector 38a.

As the thickness of the layer of the anti-reflective coating increases, the power of the radiation emitted from the uncoated end surface 30a of the laser 26a decreases. When the anti-reflective coating reaches a thickness of one-quarter the wavelength of the emitted radiation in the material of the anti-reflective coating, the power of the radiation emitted from the uncoated end surface 30a will be at a minimum. Thus, when the output signal from the radiation detector 38a reaches a minimum, the coating operation is stopped and the laser 26a will have an anti-reflective coating on the end surface 28a of the desired thickness of one-quarter the wavelength of the emitted radiation. Although the one-quarter wavelength thickness may vary with different materials used for the anti-reflective coating, this method will achieve the desired thickness as long as the index of refraction of the anti-reflective material is less than the index of refraction of the material of the laser 26a. Since the same effect occurs with odd multiples of one-quarter wavelength, this method can be used to achieve anti-reflective coatings of any odd multiple of one-quarter wavelength thickness.

Thus, there is provided by the present invention methods of coating an end surface of a semiconductor laser with an anti-reflective coating wherein the thickness of the anti-reflective coating and thereby the reflectivity of the coated end surface is determined by monitoring the power of the radiation emitted by the laser. In two forms of the method the ratio of the power of the radiation emitted from the coated end surface and the uncoated end surface is monitored to determine when a desired reflectivity of the coated end surface is achieved. In another form of the method the power of the radiation emitted from only the uncoated end surface is monitored to determine when an anti-reflective coating of a thickness of one-quarter the wavelength of the emitted radiation is achieved. Although the method of the present invention has been described with regard to applying the anti-reflective coating by the technique of vacuum evaporation, the method can be used with any means of applying the anti-reflective coating wherein the thickness of the coating is progressively increased.

Although the method of the present invention has been described with regard to coating a single semiconductor laser with an anti-reflective coating, it can be used to coat a plurality of semiconductor lasers simultaneously. When coating a plurality of the semiconductor lasers, the anti-reflective material is applied to an end surface of all of the semiconductor lasers simultaneously. However, during the coating operation, the radiation output of only one of the semiconductor lasers is monitored to determine when the desired reflectivity is achieved. When the desired reflectivity of the coated end surfaces of the monitored semiconductor laser has been reached, the other semiconductor lasers will have corresponding reflectivities. Also, the method of the present invention can be used to apply anti-reflective coatings to devices other than semiconductor lasers, such as mirrors, lenses and the like. For this purpose, all of the devices and an end surface of a semiconductor laser are simultaneously coated with the anti-reflective material. During the coating operation the power of the radiation emitted from the semiconductor laser is monitored to determine the reflectivity of the coated end surface of the laser. Since this also provides an indication of the reflectivity of the anti-reflective coatings on the other devices, the semiconductor laser can be used to determine when an anti-reflective coating of the desired thickness has been obtained on the other devices. Thus, the method of the present invention can be used not only to determine when an anti-reflective coating of the desired reflectivity has been achieved on the monitored semiconductor laser but also when such a coating is also achieved on other semiconductor lasers or other devices which are coated simultaneously with the monitored semiconductor laser.

We claim:

1. In a method of applying an anti-reflective coating wherein the improvement comprises the steps of
coating an end surface of a semiconductor laser with an anti-reflective material in a manner so as to progressively increase the thickness of the layer of the material,
measuring the radiant energy output of the laser during the coating as the thickness of the coating increases, and
stopping the coating when a desired output is achieved.

2. The method in accordance with claim 1 wherein the measuring of the radiant energy output of the laser includes measuring the power of the radiation emitted from the end surface of the laser opposite to the end surface being coated.

3. The method in accordance with claim 2 wherein the measuring of the radiant energy output of the laser comprises only measuring the power of the radiation emitted from the end surface of the laser opposite to the end surface being coated.

4. The method in accordance with claim 3 wherein the coating operation is stopped when the power of the radiation emitted from the end surface of the laser opposite to the coated end surface reaches a minimum.

5. The method in accordance with claim 2 wherein the measuring of the radiant energy of the laser also includes measuring the power of the radiation emitted from the coated end surface of the laser.

6. The method in accordance with claim 5 wherein the measuring of the radiant energy of the laser comprises measuring the ratio of the power of the radiant energy emitted from the two said end surfaces of the laser.

7. The method in accordance with claim 6 wherein the coating operation is intermittently interrupted and the radiant energy output of the laser is measured during the interruption.

8. The method in accordance with claim 6 wherein the radiant energy output of the laser is measured continuously during the coating of the end surface.

References Cited
UNITED STATES PATENTS

| | | | |
|---|---|---|---|
| 3,484,713 | 12/1969 | Fenner | 331—94.5 |
| 3,721,584 | 3/1973 | Diem | 117—33.3 X |
| 3,467,906 | 9/1969 | Cornely et al. | 331—94.5 X |
| 3,695,910 | 10/1972 | Louderback et al. | 117—33.3 |

MAYER WEINBLATT, Primary Examiner

U.S. Cl. X.R.

117—33.3, 106 A, 106 R; 331—94.5; 350—164